(12) United States Patent
Morton et al.

(10) Patent No.: US 7,572,988 B1
(45) Date of Patent: Aug. 11, 2009

(54) METHOD FOR ONBOARD VEHICLE WEIGHT MEASUREMENT

(76) Inventors: Gregory D. Morton, 1700 N. School St., Apartment 12, Normal, IL (US) 61761; Michael J. Hadden, 1700 N. School St., Apartment 12, Normal, IL (US) 61761

( * ) Notice: Subject to any disclaimer, the term of this patent is extended or adjusted under 35 U.S.C. 154(b) by 0 days.

(21) Appl. No.: 12/171,227

(22) Filed: Jul. 10, 2008

(51) Int. Cl.
   *G01G 19/08* (2006.01)
(52) U.S. Cl. .................. 177/137; 177/141; 702/174
(58) Field of Classification Search .......... 177/137, 177/141; 702/174
   See application file for complete search history.

(56) References Cited

U.S. PATENT DOCUMENTS

| | | | |
|---|---|---|---|
| 4,431,072 A | 2/1984 | Stepp | |
| 4,832,141 A * | 5/1989 | Perini et al. | 177/141 |
| 4,835,719 A * | 5/1989 | Sorrells | 702/174 |
| 4,852,674 A * | 8/1989 | Gudat | 177/141 |
| 4,854,407 A | 8/1989 | Wagner | |
| 5,167,289 A | 12/1992 | Stevenson | |
| 5,478,974 A * | 12/1995 | O'Dea | 177/25.14 |
| D378,199 S | 2/1997 | Stionelli | |
| 5,780,782 A * | 7/1998 | O'Dea | 177/136 |
| 6,069,324 A | 5/2000 | Shimizu et al. | |
| 6,307,164 B1 | 10/2001 | Campbell | |
| 6,449,582 B1 | 9/2002 | Chaklader | |
| 6,921,100 B2 * | 7/2005 | Mantini et al. | 280/407 |
| D524,668 S | 7/2006 | Stowers et al. | |

* cited by examiner

*Primary Examiner*—Randy W Gibson

(57) ABSTRACT

The method for onboard vehicle weight measurement is provided for a tractor and trailer and also for a truck. A pressure sensor is installed on each airbag. A computer is fitted to the truck. Two computers are fitted to the tractor and trailer, respectively. A display is mounted within the cab. A converter is mounted to the cab. An air pressure value from each airbag with sensor is collected and transmitted to the computer or computers, respectively. Weight is computed for each airbag with sensor, each axle, trailer weight, tractor weight, combined tractor and trailer weight, and truck weight, and the weights sent to the converter. Signals are converted by the converter and conveyed to the display monitor for individual display.

2 Claims, 3 Drawing Sheets

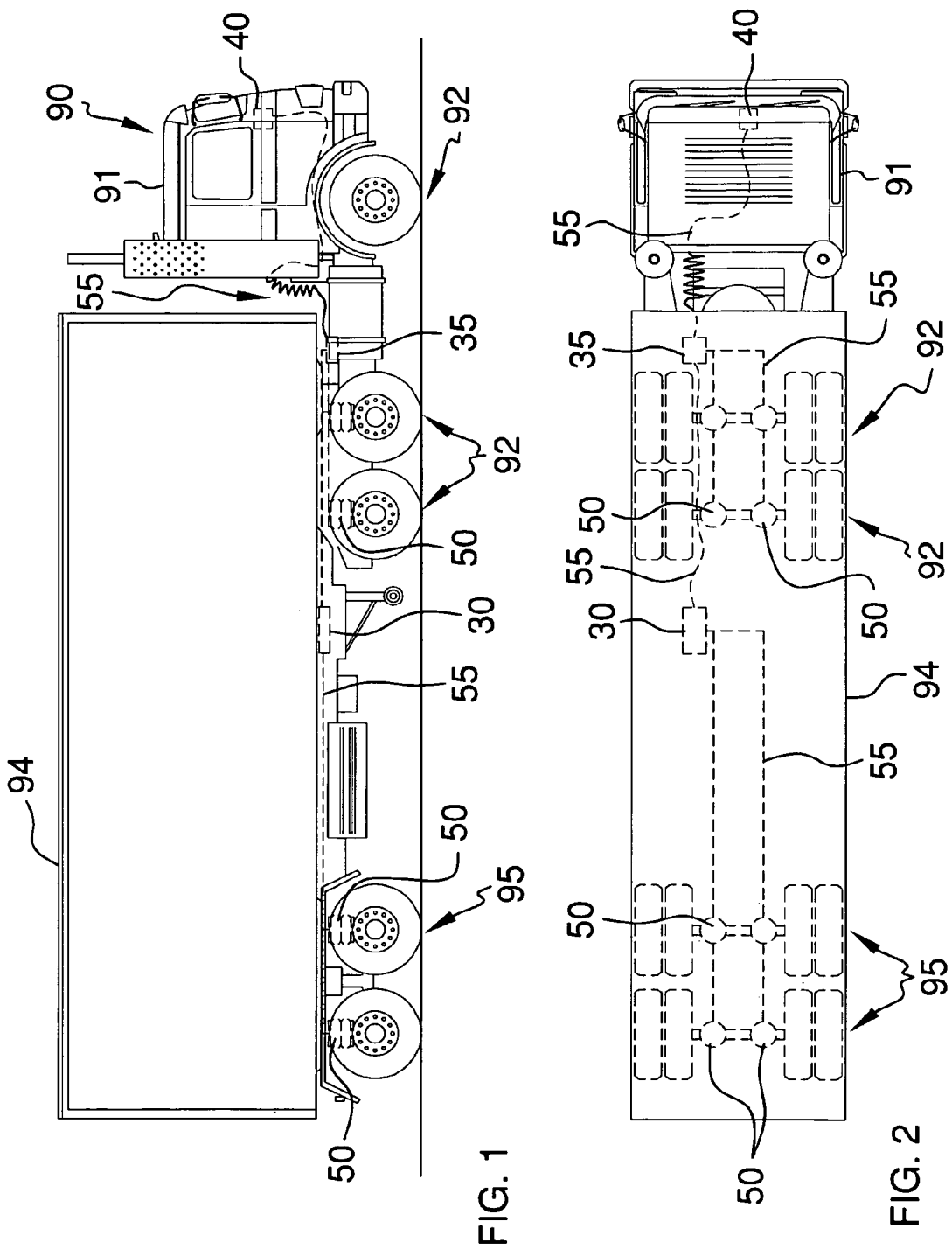

METHOD FOR ONBOARD VEHICLE WEIGHT MEASUREMENT

BACKGROUND OF THE INVENTION

Airbags are used as springs, for load leveling, and for ride control on cargo vehicles such as tractor trailers, tandem trailers, and trucks. An unloaded vehicle registers a given pressure at each air bag. It is typically desirable to load a vehicle in a specific fashion, to regulate the weight imposed on each axle and each side of each axle of the vehicle and of a trailer. Determining the gross weight of a vehicle and determining the weight imposed upon each side of each axle has long been problematic. Weight determination is desirable for several reasons, which include improper load balance and excessive overall vehicle weight. Legal and practical limits are placed on vehicle weights and load distributions. The problems associated with overload and improper load balances are well understood in the commercial trucking industry. Additionally, loads vary with various trailers and with various loads, which are often unloaded at multiple stations, thereby changing load balance.

It has been determined that onboard display of weight load and load balances is highly desirable, but previously provided systems and methods for determining such have been overly complex and also poorly displayed and understood by truck drivers. Less than user-friendly systems and methods invite either misuse or no use by truck and tractor operators. What has been needed is a method for determining and displaying weight load per axle, per axle side, for tractor, trailer, tractor and trailer combined, and for a truck. The method must be basic and provide onboard display of weights in a graphic instantly understood by an operator. The present method provides for these needs.

FIELD OF THE INVENTION

The method for onboard vehicle weight measurement relates to devices for and methods for determining vehicular weights and more especially to a method for onboard vehicle weight measurement which uses truck, tractor, and trailer airbags with sensors and provides an in cab display of actual weights for each side of each axle of a truck, tractor, and trailer, axle weights, and combined weights.

SUMMARY OF THE INVENTION

The general purpose of the method for onboard vehicle weight measurement, described subsequently in greater detail, is to provide a method for onboard vehicle weight measurement which has many novel features that result in an improved method for onboard vehicle weight measurement which is not anticipated, rendered obvious, suggested, or even implied by prior art, either alone or in combination thereof.

To attain this, the method for onboard vehicle weight measurement uses airbags with sensors to obtain pressures from each side of each axle. In one method, a computer is fitted to a truck. In a second method a computer is fitted to both truck and tractor. A display monitor is affixed within the cab of a tractor or truck. A converter is mounted to the cab. Air pressure value is collected from each airbag with sensor. Each value is transmitted from each sensor to the computer of the truck or to the computers of the tractor and trailer. In the first method in use on a truck, the computer computes the weight for each bag with sensor, a weight for each axle, and a total truck weight. In the second method, the first computer fitted to the trailer computes the weight for each airbag with sensor and the axle weight of each trailer axle. The second computer computes the weight of each airbag with sensor of the tractor, each tractor axle, the tractor, and the entire tractor and trailer. The converter of each method converts weights to signals. The signals are conveyed to the display monitor in each of the above applications. The individually computed weights are displayed on the monitor.

Thus has been broadly outlined the more important features of the improved method for onboard vehicle weight measurement so that the detailed description thereof that follows may be better understood and in order that the present contribution to the art may be better appreciated.

An object of the method for onboard vehicle weight measurement is to provide safe vehicles with regard to weight and weight balance.

Another object of the method for onboard vehicle weight measurement is to prevent accidents.

A further object of the method for onboard vehicle weight measurement is to avoid fines.

An added object of the method for onboard vehicle weight measurement is to work in concert with airbag suspension of trucks, tractors, and trailers.

And, an object of the method for onboard vehicle weight measurement is to provide exact weight values to a truck driver, per axle and per axle side, for a trailer, a tractor, and tractor and trailer, and a truck.

These together with additional objects, features and advantages of the improved method for onboard vehicle weight measurement will be readily apparent to those of ordinary skill in the art upon reading the following detailed description of presently preferred, but nonetheless illustrative, embodiments of the improved method for onboard vehicle weight measurement when taken in conjunction with the accompanying drawings.

In this respect, before explaining the current embodiments of the improved method for onboard vehicle weight measurement in detail, it is to be understood that the method for onboard vehicle weight measurement is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the improved method for onboard vehicle weight measurement. It is therefore important that the claims be regarded as including such equivalent constructions insofar as they do not depart from the spirit and scope of the method for onboard vehicle weight measurement. It is also to be understood that the phraseology and terminology employed herein are for purposes of description and should not be regarded as limiting.

BRIEF DESCRIPTION OF THE DRAWINGS

FIG. 1 is a lateral elevation view of a tractor and trailer using the present method for onboard vehicle weight measurement.

FIG. 2 is a top plan view of FIG. 1.

DETAILED DESCRIPTION OF THE DRAWINGS

Figure 3:
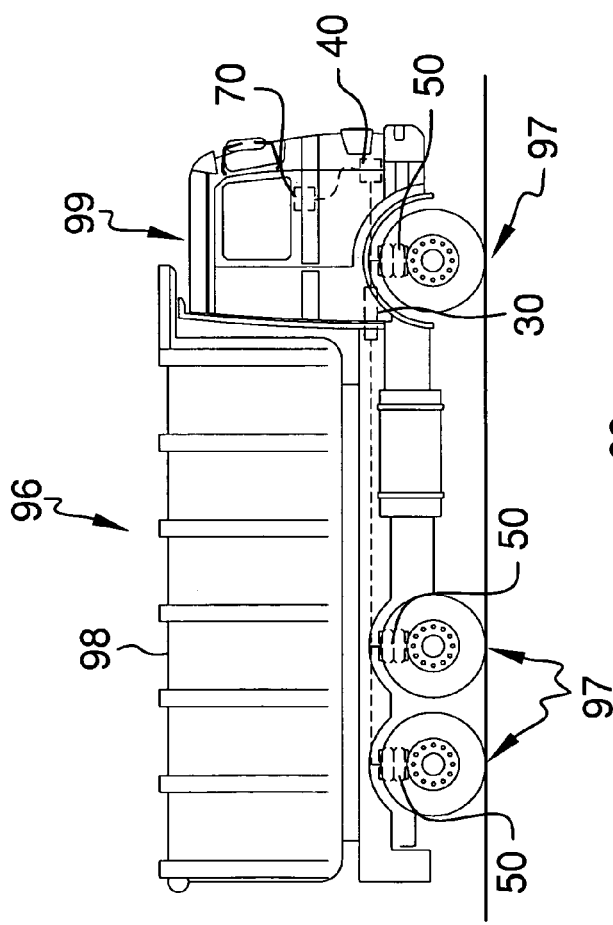
FIG. 3 is a lateral elevation view of a dump truck using the present method.

With reference now to the drawings, and in particular FIGS. 1 through 6 thereof, the principles and concepts of the method for onboard vehicle weight measurement generally designated by the reference number 10 will be described.

Referring to FIGS. 1, 2, 5, and 6, the method for onboard vehicle weight measurement 10 is employed on the illustrated tractor 91 and trailer 94. The airbags with pressure sensors 50 are installed on the tractor 91 and the trailer 94. Sensors are installed to existing airbags via either retrofit to existing equipment or as original manufacturer's equipment (OEM). The first computer 30 is fitted to the trailer 94. The second computer 35 is fitted to the tractor 90. An air pressure value is collected from each airbag with sensor 50. The value from each airbag with sensor 50 from the trailer 94 is transmitted to the first computer 30. The value from each tractor 90 airbag with sensor 50 is transmitted to the second computer 35. The first computer 30 computes each value from each airbag with sensor 50 of the trailer 94 into a weight, respectively. The first computer 30 computes the weight for each trailer axle 95. The second computer 35 computes each value from each airbag with sensor 50 of the tractor 90 into a weight, respectively.

The second computer computes the weight for each tractor axle 92, the weight for total trailer 94, the weight for total tractor 90, and combined total weight of the tractor 90 and trailer 94. The second computer 35 conveys each airbag with sensor 50 weight, each axle weight, the trailer 94 weight, the tractor 90 weight, and the total tractor 90 and trailer 94 weight to the converter 40. A display monitor 70 is affixed within the tractor cab 91. The converter 40 mounted to the tractor cab 91 converts the information from the computers into individual signals for the display monitor 70. The first computer 30, second computer 35, and converter 40 are programmed with manufacturer's information and with information needed to determine the difference between unloaded weight and loaded weight of the tractor 90 and trailer 94. Electrical connections 55 provide communication between the electrical components including the airbags with sensors 50, the first computer 30, the second computer 35, the converter 40, and the display monitor 70. Signals from the converter 40 are conveyed to the display monitor 70. At the display monitor 70, the separate weight for each airbag with sensor 50 is displayed. The total weight for each tractor axle 92 is displayed. The total weight for each trailer axle 95 is displayed. The total weight for the combined tractor 90 and trailer 94 is displayed. A tractor 90 operator need not guess at axle weights, tractor 90 weights, trailer 94 weights, or a given weight on either side of a trailer axle 95 or tractor axle 92 where an airbag with sensor 50 is positioned. The operator need not resort to conversion of percentage readouts on the display monitor 70, but note only the exact positional weights and totals displayed on the display monitor 70.

Figure 4:
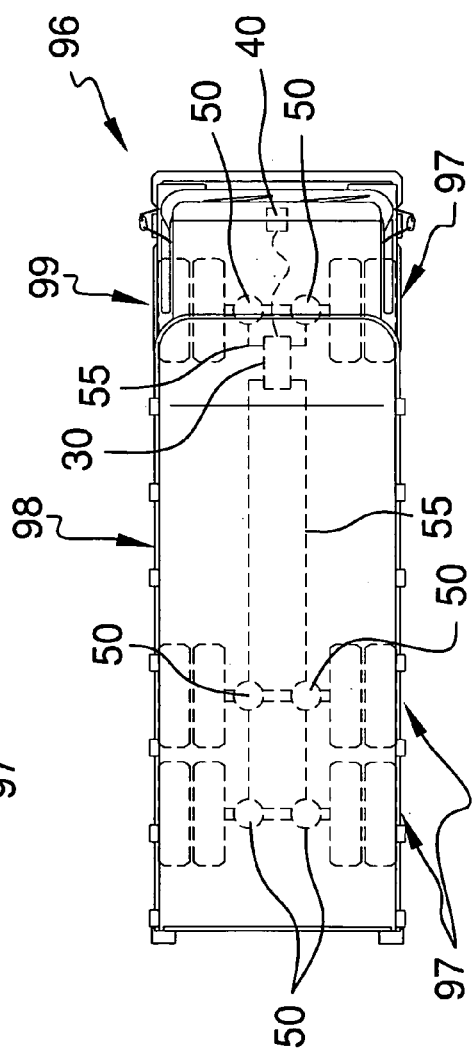
FIG. 4 is a top plan view of FIG. 3.
Figure 5:
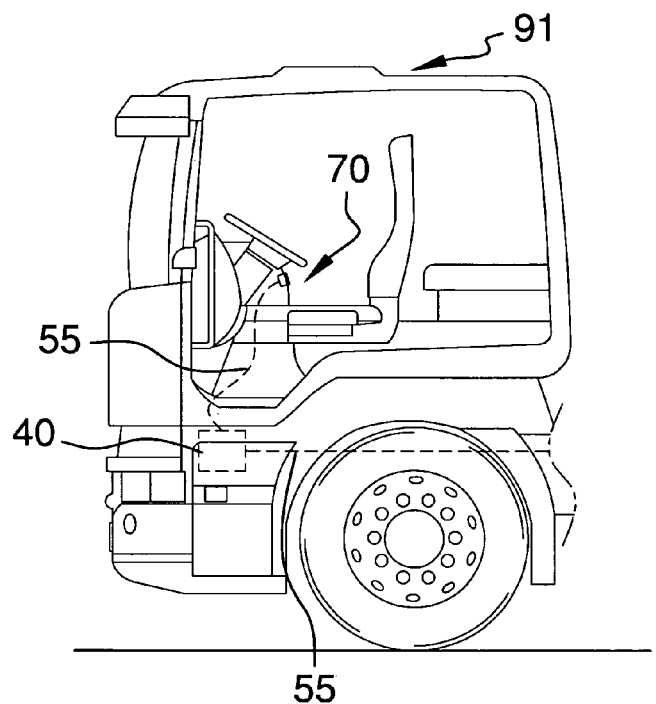
FIG. 5 is a cross sectional view of the cab of a tractor or a dump truck using the present method.
Figure 6:
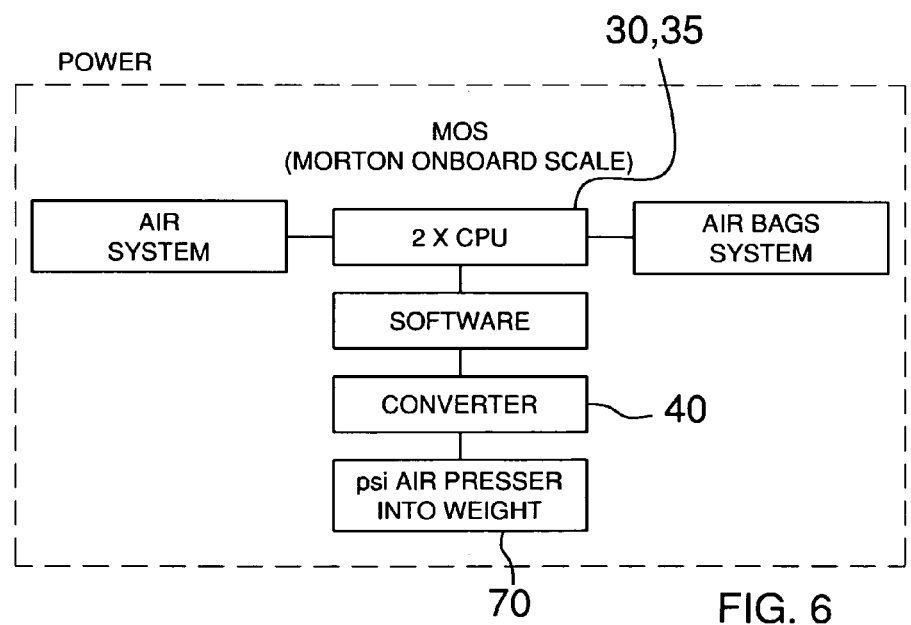
FIG. 6 is a schematic block diagram of communication between components of the present method.

Referring to FIGS. 3, 4, and 6, an embodiment of a dump truck 96 is illustrated. The method 10 for onboard vehicle weight measurement 10 is illustrated on a dump truck 96. The method 10 consists of the steps of installing a pressure sensor to each airbag of the cab 99 and bed 98 of the truck 96. The truck 96 is thereby has a plurality of airbags with sensors 50. An airbag with sensor 50 is fitted to each side of each dump truck axle 97. The computer 30 is fitted to the truck 96. The display monitor 70 is affixed within the dump truck cab 99. The converter 40 is mounted to the dumb truck cab 99. An air pressure value is collected from each airbag with sensor 50. Each value is transmitted from each airbag with sensor 50 to the computer 30. The computer 30 computes a weight for each airbag with sensor 50, each truck axle 97 weight, and the total truck 96 weight. Each weight is converted into a signal, respectively, by the converter 40. Each signal is conveyed to the display monitor 70. Each separate weight is displayed by the display monitor 70.

With respect to the above description then, it is to be realized that the optimum dimensional relationships for the parts of the method for onboard vehicle weight measurement, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the method for onboard vehicle weight measurement.

Directional terms such as "front", "back", "in", "out", "downward", "upper", "lower", and the like may have been used in the description. These terms are applicable to the embodiments shown and described in conjunction with the drawings. These terms are merely used for the purpose of description in connection with the drawings and do not necessarily apply to the position in which the method for onboard vehicle weight measurement may be used.

Therefore, the foregoing is considered as illustrative only of the principles of the method for onboard vehicle weight measurement. Further, since numerous modifications and changes will readily occur to those skilled in the art, it is not desired to limit the method for onboard vehicle weight measurement to the exact construction and operation shown and described, and accordingly, all suitable modifications and equivalents may be resorted to, falling within the scope of the method for onboard vehicle weight measurement.

What is claimed is:

1. A method for onboard vehicle weight measurement, the method consisting of the steps of:
    installing a pressure sensor to an each airbag of a cab and a bed of a truck;
    fitting a computer to the truck;
    affixing a display monitor within the cab;
    mounting a converter to the cab;
    collecting an air pressure value from each airbag with sensor;
    transmitting the value from each airbag with sensor to the computer;
    computing a weight at each airbag with sensor, an each truck axle weight, and a total truck weight;
    converting each weight into a signal, respectively;
    displaying each weight on the display monitor.

2. A method for onboard vehicle weight measurement, the method consisting of the steps of:
    installing a pressure sensor to an each airbag of a tractor and a trailer;
    fitting a first computer to the trailer, a second computer to the tractor;
    affixing a display monitor within a cab of the tractor;
    mounting a converter to the tractor;
    collecting an air pressure value from each airbag with sensor;
    transmitting each value from each sensor to the computers, the values from the trailer transmitted to the first computer, the values from the tractor transmitted to the second computer;

computing a weight for each airbag with sensor, an each trailer axle weight, an each tractor axle weight, a total trailer weight, a total tractor weight, and a combined total tractor and trailer weight;
converting each weight into a signal, respectively;
conveying each signal to the display monitor;
displaying each separate weight for each airbag of the trailer, a total weight for an each axle of the trailer, a total weight for each axle of the tractor, and a total weight for the combined tractor and trailer.

\* \* \* \* \*